Sept. 26, 1967 P. H. NANKIVELL 3,343,560
ANTI-HAMMER UNDER-FIXTURE VALVE
Filed March 29, 1965
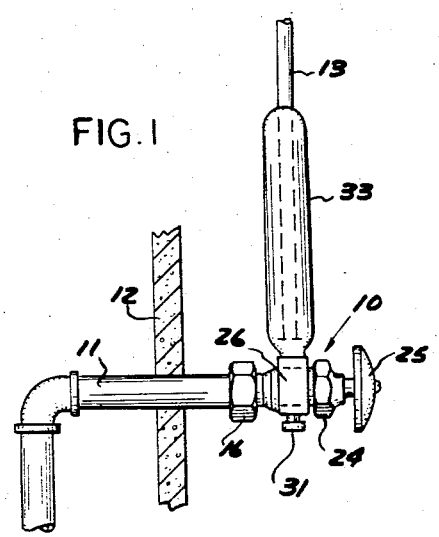
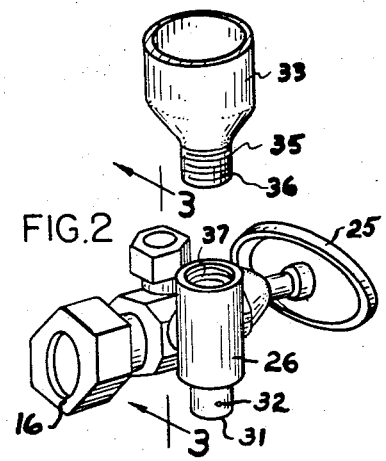
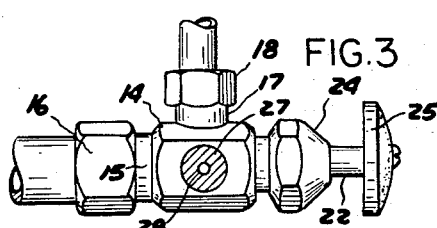
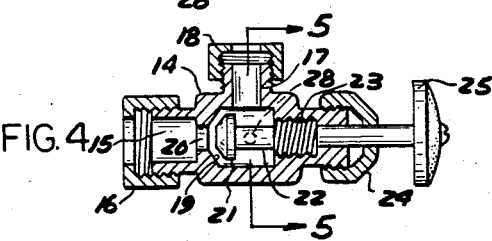
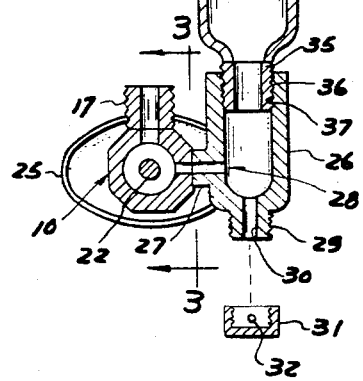
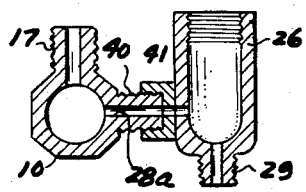
INVENTOR.
PAUL H. NANKIVELL
BY Cullen, Sloman & Cantor
ATTORNEYS

United States Patent Office 3,343,560
Patented Sept. 26, 1967

3,343,560
ANTI-HAMMER UNDER-FIXTURE VALVE
Paul H. Nankivell, Elkhart, Ind., assignor to Brass-Craft
Manufacturing Company, Detroit, Mich.
Filed Mar. 29, 1965, Ser. No. 443,323
5 Claims. (Cl. 137—207)

ABSTRACT OF THE DISCLOSURE

An anti-hammer, under fixture valve having a valve body with inlet and outlet ports and a valve closure for shutting off flow, and with a vertically elongated closed tube removably secured to a socket member formed upon the body, the socket member communicating with the interior of the body at the outlet side of the closure, so that the tube functions as an antihammer, air reservoir which can be easily removed for installation of and removal of the valve from its connecting plumbing pipes.

---

This invention relates to an anti-hammer under-fixture valve, and more particularly, to a shut-off type of valve, normally located adjacent to (i.e. beneath) a conventional fixture valve such as a sink valve, and having a pulsation dampening, anti-water-hammer air chamber.

In the construction of water lines which supply water to various plumbing fixtures in a building, such as sinks, toilets, washing machines, etc., it is conventional to provide an under-fixture valve located beneath the conventional on-off valve used for the fixture, with such under-fixture valve functioning to shut off the water supply to the fixture valve for purposes of repairs, replacements of washers, etc. Thus, the conventional plumbing line consists of piping which carries water, from the water source, within the walls of the building, and extends outwardly of such walls, at plumbing fixtures, to under-fixture valves and thereafter extends to the fixture valves. The under-fixture valves normally remain open.

In conventional plumbing lines or pipes, air enters into such lines in various ways, and frequently causes a hammering or a chattering in the lines and particularly in or near the fixture valve when such valves are opened. This hammering or chattering, if powerful enough, as it is at times, can seriously shake the conventional copper plumbing pipes and particularly the various connections, joints and elbows used therewith, and cause breakage and leakage, which is difficult to repair since most of the parts are within the wall of the building.

Thus, various means have been devised to attempt to eliminate air from the lines or to provide reservoirs in the lines which act as shock absorbers to absorb the hammering. Many building codes require reservoirs built into water lines, inside the walls of the buildings. However, in such reservoirs, the air contained therein tends to mix with water with the result that eventually the reservoirs become water logged, and thus no longer operable until emptied. Because such reservoirs are inside the walls, in order to bleed the water out of them it becomes necessary to shut off the entire water supply in the building and drain the entire water line system, which is a difficult and time consuming job. In addition, the owner of the building frequently may not realize that the reservoirs are water logged until after serious hammering and damage has taken place.

Hence, it is an object of this invention to provide an anti-hammer reservoir or under-fixture valve attachment which is built into and connected with the exposed under-fixture valve so that the reservoir is easily accessible to the home owner, normally being located just beneath the plumbing fixture, such as just beneath a sink, or adjacent to a toilet, and wherein such reservoir is not only easily accessible but also may be bled free of water when it becomes water logged in a simple and quick manner without the necessity of bleeding or draining the entire water system in the building.

Another object of this invention is to provide an anti-hammer reservoir in connection with an under-fixture valve which is easily accessible beneath the conventional plumbing fixture and which may be bled free of water, when it becomes water logged, by the simple expedient of turning off the under-fixture valve and then opening a bleed-off cap to drain the reservoir, after which the cap may be tightened and the under-fixture valve opened so that within a few moments any one of the reservoirs may be drained and made operable again without the need to drain the water supply lines in the building.

These and other objects and advantages of this invention will become apparent upon reading the following description of which the attached drawings form a part.

In these drawings:

FIG. 1 is an elevational view of the anti-hammer under-fixture valve connected to a water line extending through a wall.

FIG. 2 is a perspective view of the valve and a portion of the tubular anti-hammer reservoir.

FIG. 3 is an elevational view of the valve, with the anti-hammer reservoir removed therefrom, taken in the direction of arrows 3—3 of FIG. 5.

FIG. 4 is a view similar to FIG. 3, but showing the valve in cross-section with the piping removed.

FIG. 5 is a cross-sectional view, taken in the direction of arrows 5—5 of FIG. 4, showing the anti-hammer reservoir in position.

FIG. 6 is a cross-sectional view similar to FIG. 5 but shows a modification, and for illustration purposes, certain parts have been omitted.

Referring to FIG. 1, the anti-hammer under-fixture valve comprises a valve 10 to which is connected a water inlet pipe 11, which extends through a wall 12 so that the supply pipe is within the wall and the valve is outside and adjacent to the wall. A vertically extending outlet line 13 connects at its upper end to a conventional fixture valve (not shown) such as a faucet or a toilet valve or the like.

The valve 10 is formed of a normally horizontally arranged, but sometimes vertically arranged, hollow, valve body 14, having an inlet port end extension 15 upon which is threaded a nut 16 for connecting the end of the inlet line 11 to the valve. An outlet port extension 17 is formed on the upper portion of the valve body and is provided with a threaded nut 18 for securing the outlet line 13 to the valve.

Within the valve body, between the inlet and outlet ports is formed a valve seat 19 having a fluid flow opening 20 which is closed off, when desired, by a valve closure member 21 formed on the end of a valve stem 22 which moves toward and away from the valve seat.

A threaded portion 23 is formed on the valve stem 22 and threadedly engages a correspondingly threaded area within the valve body for movement of the stem relative to the valve body.

The valve stem fits through an opening in a threaded cap nut 24 which closes off the valve stem end of the valve body. In addition, a conventional handle 25 is secured to the free end of the valve stem for turning the stem to thereby advance the valve member 21 into engagement with the valve seat for shutting off water flow or for retracting same into its normally open position for permitting water to flow from the inlet line 11, through the inlet port end extension 15, and through the opening 20 formed in the valve seat 19, and then upwardly through the outlet port extension 17 and the outlet line 13 to the fixture valve located above (not shown).

The above valve construction is conventional and forms no part of the invention hereof. The invention herein relates to the air reservoir or anti-hammer chamber as follows:

A vertically arranged, upwardly opening, cup-shaped socket member 26 is secured to the outside of the valve body 14 by means of a short connecting ring 27 which may be welded or brazed or otherwise permanently secured to both the valve body and the socket member. Alternatively, the socket member may be directly secured against the valve body by welding or the like.

A passageway 28 extends through the valve body, the ring 27 and the socket member 26, to communicate the interior of the valve body with the interior of the cup-shaped member. The passageway opens into the valve body between the valve seat and the outlet port so that when the valve member is sealed against the valve seat, the passageway is open and exposed to the interior of the valve body.

On the lower end of the socket member is formed a downwardly extending threaded stud 29, through which extends an opening 30. This stud is closed off by means of a threaded closure cap 31 whose exterior is preferably knurled or roughened for manual gripping, so that by turning the cap upon the stud, the cap will seal off the opening 30.

A transversely extending opening 32 is formed through the cap wall (see FIG. 5) so that the cap may be partially unthreaded relative to the stud to thus expose the opening 32 into communication with the opening 30 of the stud for draining the socket.

Connected to the socket is a vertically elongated tube 33 whose upper end is closed at 34 and whose lower end is formed into a nipple 35 which is preferably provided with threads 36 for threadedly engaging with threads 37 formed within the socket.

In operation, the valve may be installed as original equipment in a building, or as a replacement valve for an already existing under-fixture valve, by first removing the tube 33 and then manipulating and handling the valve in the conventional manner to secure it to the ends of the inlet pipe 11 and the outlet pipe 13. With the tube removed, the valve can be turned relative to the wall or relative to the adjacent fixture without interference from the tube. Thereafter the tube is threaded into place and thus sealed to the valve.

Normally, the valve is left open, and water passes through it to the fixture. The tube being filled with air, acts as a reservoir and as a dampening or shock absorbing means for absorbing hammering in the water lines due to air trapped in the water. When the tube becomes substantially water logged, that is, substantially full of water, chattering or hammering may occur when the fixture valve is opened. At first sign of such hammering, the under-fixture valve is shut off by simply turning the handle 25, and thereafter, the cap 31 is manually loosened, until its opening 32 is clear, to drain the water from the tube 33. Once the tube is drained and again filled with air, the cap 31 is tightened and the under-fixture valve reopened by turning the valve handle 25.

The tube may be small and inconspicuous since it is so readily accessible for draining whenever desired. For example, a tube which is about one inch in diameter and about six inches in overall height from top to bottom, including the nipple portion, should be adequate for a house sink.

FIG. 6 illustrates a modification wherein the cup-shaped socket member is releasably connected to the valve body by means of forming a laterally extending, threaded stud 40 on the valve body, which stud is received in a threaded receptacle 41 secured to the socket member. The passageway 28a extends through the threaded stud 40 and receptacle 41. The construction and operation of this modification is otherwise the same as that described above.

This invention may be further developed within the scope of the following claims. Accordingly, it is desired that the foregoing description be read as being merely illustrative of an operative embodiment of this invention and not in a strictly limited sense.

I claim:
1. An anti-hammer, under fixture valve, comprising a hollow valve body having an inlet port, an outlet port, and a valve seat arranged within the body between said ports; a valve member arranged inside said body for sealing against said seat for shutting off fluid flow between said ports, and valve member means for moving the valve member into and out of sealing engagement with said seat; the improvement comprising an upwardly opening, cup-shaped socket member secured to the outside of the body member and having a passageway communicating the interior of the socket to the interior of said valve body between said seat and said outlet port; an opening formed in the lower end of said socket member, and a cap means normally closing said opening, but being manually openable for draining fluid from said socket member; and a vertically elongated tube having a closed upper end and an open lower end fitted into and sealed within said socket member.

2. A construction as defined in claim 1, an interengaging means formed on the lower end of said tube and in said socket member for releasably connecting the two together, wherein said tube may be manually removed from and attached to said socket member.

3. A construction as defined in claim 1, and wherein said socket member is provided with a downwardly extending, threaded stud on its bottom, said opening extending through said stud; and said cap means being formed in a cup-shape, with threads formed on the interior thereof for threadedly engaging with said stud for closing off said opening.

4. A construction as defined in claim 3, and an opening formed transversely through the wall of said cap between its upper and lower ends for communicating said stud opening with atmosphere when the cap is partially unthreaded relative to the stud.

5. A construction as defined in claim 1, and including a threaded stud extending outwardly of said valve body and a correspondingly threaded receptacle mounted upon the side of said socket member for threadedly connecting the socket member to the valve body; said passageway extending through said stud and receptacle.

References Cited

UNITED STATES PATENTS 1,027,980    5/1912    Bliler   ---------------- 137—207
1,865,486    7/1932    Seymour   ----------- 137—207

ALAN COHAN, *Primary Examiner.*